(12) United States Patent
Loce et al.

(10) Patent No.: US 8,564,840 B2
(45) Date of Patent: Oct. 22, 2013

(54) HALFTONE TILING AND HALFTONING FOR ANNULAR RASTERS

(75) Inventors: Robert Paul Loce, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 704 days.

(21) Appl. No.: 12/789,512

(22) Filed: May 28, 2010

(65) Prior Publication Data

US 2011/0292450 A1  Dec. 1, 2011

(51) Int. Cl.
*H04N 1/405* (2006.01)
(52) U.S. Cl.
USPC .......... 358/3.2; 358/3.06; 358/3.01; 358/1.9; 347/2; 347/12; 347/40; 347/14; 347/1
(58) Field of Classification Search
None
See application file for complete search history.

(56) References Cited

U.S. PATENT DOCUMENTS

| | | | |
|---|---|---|---|
| 4,149,194 A | 4/1979 | Holladay | |
| 4,185,304 A | 1/1980 | Holladay | |
| 5,235,435 A | 8/1993 | Schiller | |
| 5,303,334 A | 4/1994 | Snyder | |
| 5,631,748 A | 5/1997 | Harrington | |
| 5,673,121 A | 9/1997 | Wang | |
| 5,721,625 A * | 2/1998 | Furusawa et al. | 358/3.14 |
| 6,014,500 A | 1/2000 | Wang | |
| 6,264,295 B1 * | 7/2001 | Bradshaw et al. | 347/2 |
| 6,501,567 B2 | 12/2002 | Sharma et al. | |
| 6,844,941 B1 | 1/2005 | Sharma et al. | |
| 6,989,913 B2 | 1/2006 | Asai | |
| 7,085,017 B1 * | 8/2006 | Jones et al. | 358/3.2 |
| 7,095,530 B2 | 8/2006 | Mantell et al. | |
| 7,136,189 B2 | 11/2006 | Sharma et al. | |
| 7,457,004 B2 | 11/2008 | Asai | |
| 2005/0243338 A1 | 11/2005 | McClellan | |
| 2006/0238813 A1 * | 10/2006 | Jones et al. | 358/3.06 |
| 2006/0268294 A1 | 11/2006 | Yao et al. | |
| 2006/0268295 A1 | 11/2006 | Yao et al. | |
| 2008/0181092 A1 | 7/2008 | McClellan | |

* cited by examiner

*Primary Examiner* — Paul F Payer
(74) *Attorney, Agent, or Firm* — Fay Sharpe LLP

(57) ABSTRACT

An aspect of the present disclosure provides a halftoning method for annular rasters comprising: using annular rasters with uniformly spaced raster lines and uniformly spaced pixels within the raster lines; angularly tiling wedge shaped halftone cells around at least a partial circumferential print medium wherein an integer number of wedge tiles fills a disc space; wherein the annular rasters are considered in arcs and wherein pixel thresholds in the wedge shaped halftone cells are considered in arcs so as to conform to the annular rasters upon tiling the wedge shaped halftone cells; and, setting the number of pixel thresholds in each arc raster of the cell to an integer value near a desired writing resolution to enable seamless tiling wherein the number of thresholds increase as a function of a wedge cell radius.

17 Claims, 5 Drawing Sheets

DISC PARTITIONED BY REPEATING WEDGE
CELLS THAT ARE AN INTEGER DIVISOR OF
360° IN WIDTH FOR FULL DISC WRITING

IMAGE AREA PARTITIONED BY
REPEATING WEDGE CELLS FOR
PARTIAL DISC WRITING

HALFTONE TILING AND HALFTONING FOR ANNULAR RASTERS

BACKGROUND

The perception of gray scale and color in documents is the result of a combination of a limited set of gray tones or colors over a small spatial area, in densities selected to integrate to a desired visual response. This is accomplished in many printing devices by reproducing separations of the image in halftoned form, where each separation provides varying density of a single primary color. When one halftone separation is used, the result is the appearance of monochrome image. When multiple color halftone separations of the image are combined together, the result is the appearance of a full color image.

In the digital reproduction of documents, a separation is conveniently represented as a monochromatic bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to a color hue. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. In producing a print of an image with a common printing system, it is required that an image initially described at a large set of levels also be describable at a smaller set of levels, in a manner which captures the intended appearance of the user. In digital reproduction of color documents this means that each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

Printers typically provide a limited number of output possibilities, and are commonly binary, i.e., they produce either a spot or no spot at a given location (although multilevel printers beyond binary are known). Thus, given an image or a separation in a color image having perhaps 256 possible density levels, a set of binary printer signals must be produced representing the contone effect. In such arrangements, over a given area in the separation having a number of contone pixels therein, each pixel value in an array of contone pixels within the area is compared to one of a set of preselected thresholds as taught, for example, in U.S. Pat. No. 4,149,194 to Holladay. The effect of such an arrangement is that, for an area where the image is a contone, some of the thresholds will be exceeded, i.e. the image value at that specific location is larger than the value of the threshold for that same location, while others are not. In the binary printer case, the pixels or cell elements for which the thresholds are exceeded might be printed as black or some color, while the remaining elements are allowed to remain white or uncolored, dependent on the actual physical quantity described by the data. The described halftoning or dithering method produces an output pattern that is periodic or quasiperiodic in the spatial coordinates.

U.S. Pat. No. 5,673,121 discloses an idealized stochastic screen is characterized by all of the predominant color dots (black or white) uniformly distributed. The '121 disclosure seeks to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained.

When halftone-based printers are used for engineering drawings, the most critical requirement for halftoning is the quality of reproducing fine lines, which can be in arbitrary angles, of any color and often only a few pixels in width. Since, compared to other halftone methods, stochastic screens provide the appearance of relatively high resolution at all possible gray levels with all possible orientations; they are widely accepted as the best choice for halftoning vector inputs such as engineering drawings.

The design criteria for stochastic screens require all minority pixels, black or white, are separated as much as possible. For most input levels the outputs of stochastic screens have "blue-noise" spatial spectra which provide pleasant appearance. However, due to the raster-structure limitation, near the theoretical 50% input level the design criteria force the halftone output toward a checkerboard pattern, which possesses only two equal spatial frequencies at orthogonal directions. Checkerboard patterns are often used in engineering drawings to represent different gray levels or colors. When the input is gray checkerboard pattern, i.e., at least one of the two levels is neither 0 nor 100%, the halftone output by a stochastic screen show noisy beating, or moire, between the input and the screen.

Vector halftoning transforms a continuous-tone color image into a binary color image by using one or multiple threshold screens. A screen is composed by thresholds located at different pixel locations. Instead of binarizing each plane of the image separately, an output decision is made based on all color values of the pixel. While this can be achieved in several ways, the most common way of doing it is via successive fill. In short, this method renders the color separations (e.g. CMYK) sequentially according to a pre-specified order, usually from darkest to lightest. The first separation is halftoned using the normal process of screening, and each subsequent separation is halftoned so as to minimize overlap with the previously halftoned separations by giving preference for dot placement to lighter areas of the image.

Vector halftoning is well suited for ink jet marking because the tight color-to-color registration capabilities can be used by the halftoning method to produce finer textures and a better gamut by utilizing correlation between the halftoned color planes. The method preferentially creates dot-off-dot halftone planes, which leads to those known image quality benefits.

In one exemplary application of halftoning, companies that produce, for example, CDs, DVDs, Blu-ray discs, etc., provide a demand for a labeling system using annular rasters rather than the Cartesian rasters that are used in conventional document printers. Many disc labeling systems use ink jet bars, ink jet on a sled, and IR laser thermal writing to write on the non-data side of an optical disc. The few imaging methods found in the patent literature are quite rudimentary in the realm of image quality and halftoning. More specifically, there appears to be issues such as moiré, gray-scale limitations, and graininess.

Various tiling schemes have been used for document applications. Some of these applications have been described in the following references: simple rectangular tiles in U.S. Pat. No. 4,149,194 and U.S. Pat. No. 4,185,304; shaped tiles in U.S. Pat. No. 5,235,435 and U.S. Pat. No. 5,303,334; and, Voronoi tiles in U.S. Pat. No. 6,989,913 and U.S. Pat. No. 7,457,004. The above references are herein incorporated by reference for their teachings.

While the above listed references provide background on halftoning, the present disclosure describes tiling of halftone cells—i.e. wedge tiles on disks. The present disclosure enables higher quality halftoning (higher image quality) in the labeling of discs. Heretofore applied methods, such as, polar sampling post halftoning have caused image quality defects. Other methods have added complexity when neighboring rasters vary in pixel spacing.

BRIEF DESCRIPTION

An aspect of the present disclosure provides a halftoning method for annular rasters comprising: using annular rasters with uniformly spaced raster lines and uniformly spaced pixels within the raster lines; angularly tiling wedge shaped halftone cells around at least a partial circumferential print medium wherein an integer number of wedge tiles fills a disc space; wherein the annular rasters are considered in arcs and wherein pixel thresholds in the wedge shaped halftone cells are considered in arcs so as to conform to the annular rasters upon tiling the wedge shaped halftone cells; and, setting the number of pixel thresholds in each arc raster of the cell to an integer value near a desired writing resolution to enable seamless tiling wherein the number of thresholds increases as a function of a wedge cell radius.

Another aspect of the present disclosure provides a halftoning method for annular rasters comprising: using annular rasters with uniformly spaced raster lines and uniformly spaced pixels within the raster lines; angularly tiling wedge shaped halftone cells around at least a partial circumferential print medium wherein an integer number of wedge tiles fills a disc space and an angle subtended by a wedge halftone cell width is an integer divisor of 360 degrees if the image is to be written around a full circle; wherein the annular rasters are considered in arcs and wherein pixel thresholds in the wedge shaped halftone cells are considered in arcs so as to conform to the annular rasters upon tiling the wedge shaped halftone cells; and, setting the number of pixel thresholds in each arc raster of the cell to an integer value near a desired writing resolution to enable seamless tiling wherein the number of thresholds increases as a function of a wedge cell radius.

And yet another aspect of the present disclosure provides a halftoning method for annular rasters comprising: using annular rasters with uniformly spaced raster lines and uniformly spaced pixels within the raster lines; substantially uniformly spacing pixels around an annulus wherein pixel-to-pixel spacing is similar for each the raster and wherein the number of pixels for each annular raster is an integer and includes a product of a number of pixels per inch for the annular raster and (2pi) times a radius of the annular raster; angularly tiling wedge shaped halftone cells around at least a partial circumferential print medium wherein an integer number of wedge tiles fills a disc space; wherein the annular rasters are considered in arcs and wherein pixel thresholds in the wedge shaped halftone cells are considered in arcs so as to conform to the annular rasters upon tiling the wedge shaped halftone cells; and, setting the number of pixel thresholds in each arc raster of the cell to an integer value near a desired writing resolution to enable seamless tiling wherein the number of thresholds increases as a function of a wedge cell radius.

And yet still another aspect of the present disclosure provides a system of halftoning for annular rasters comprising: using annular rasters with uniformly spaced raster lines and uniformly spaced pixels within the raster lines; angularly tiling wedge shaped halftone cells around at least a partial circumferential print medium wherein an integer number of wedge tiles fills a disc space; wherein the annular rasters are considered in arcs and wherein pixel thresholds in the wedge shaped halftone cells are considered in arcs so as to conform to the annular rasters upon tiling the wedge shaped halftone cells; substantially uniformly spacing pixels around an annulus wherein pixel-to-pixel spacing is similar for each the raster; and, wherein the uniform pixel spacing is achieved through a controlled linear velocity and a controlled pixel timing of a spinning disk while writing.

BRIEF DESCRIPTION OF THE DRAWINGS

For a better understanding of the disclosure as well as other objects and further features thereof, reference is made to the following detailed disclosure of the embodiments of the disclosure taken in conjunction with the accompanying drawings thereof, wherein.

DETAILED DESCRIPTION

The present disclosure is a method for halftone tiling and halftoning on annular rasters, which are used in some disc (i.e. CD, DVD, Blu-ray) labeling devices. The disclosure assumes annular writing (as opposed to Cartesian or spiral), and pixels that are uniformly spaced around an annulus. The disclosure utilizes wedge-shaped halftone cells that can be tiled angularly around the disc print medium. An integer number of wedge tiles fill the disc space. The thresholds in the wedge are considered in arcs so as to conform to annular rasters upon tiling the halftone cell. The number of pixel thresholds in each arc raster of the cell can be set to an integer value near the desired writing resolution to enable seamless tiling. The number of thresholds increases as a function of wedge radius. The wedge tiling method of the present disclosure is well suited for all varieties of stochastic screening, including vector stochastic screening, and may also be used with clustered dot halftones. The tiling aspect of the present disclosure could be considered as an evolution from tiling on Cartesian rasters to tiling on annular rasters. An example monochrome stochastic screen can be designed with the following specifications: 600 annular rasters/inch, <64K thresholds (approximate number of thresholds in a conventional 256×256 stochastic screen), inner wedge radius ⅝", outer wedge radius 2¼", angular width of tile 5°, number of tiles to fill a CD labeling area 72, number of arc rasters per cell 976. In operation, thresholds are accessed in a modulo manner along arc rasters as the writing device creates an annulus of dots. A single arc raster can be accessed for single spot writing devices, and multiple arc rasters can be accessed simultaneously for devices with multiple writing spots.

Optical discs include a data side and a label side. The data side is where the programs and the data are written, and the label side allows the user to label the optical disc. However, labeling can be a laborious or even an expensive process that results in an unprofessional looking label. For instance, special pre-cut labels can be printed with inkjet or other printers, but this is a labor-intensive process, as the labels must be carefully aligned on the discs and, if the labels are not properly placed on the disc, the label may damage the disc drive.

Some labeling mechanisms label the disc using horizontal sweeps (conventional Cartesian rastering) with either the writing mechanism or the disc being incrementally moved between sweeps. Such mechanisms are typically separate from the optical disc drive that writes the data or programs to the disc, and adds significant incremental cost to the production of the discs.

Figure 1:
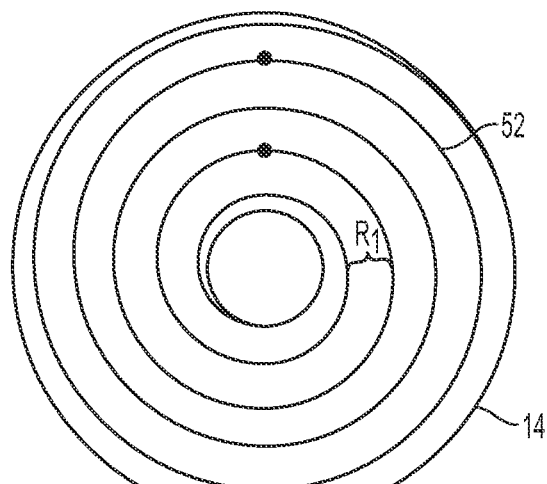
FIG. 1 is a schematic illustration of spiral rasters.
Figure 2:
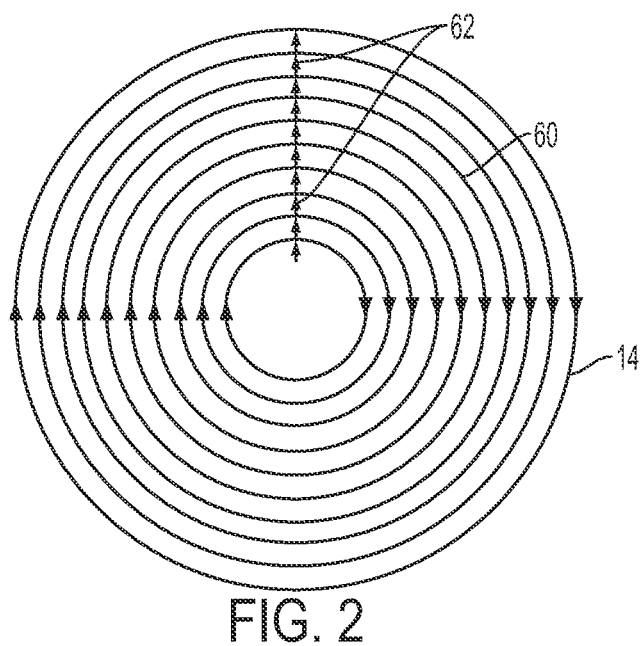
FIG. 2 is a schematic illustration of annular rasters.

Radially oriented labeling mechanisms can be integrated with the optical disc drive that writes the data or programs to the disc, thereby saving time in the disc production process. The actual writing is typically performed using either an IR laser on thermally sensitive media, a single ink jet, or an ink jet array. Available radial writing devices are capable of writing in either spiral or annular rasters as shown in FIGS. 1 and 2, respectively.

The present disclosure is directed to those devices that write in annular rasters with pixels that are evenly spaced around the annulus. The even spacing can be achieved either through constant linear velocity with constant pixel timing or constant angular velocity with pixel timing adjusted to account for increase in linear velocity with increasing radius of the arc raster.

Figure 3:
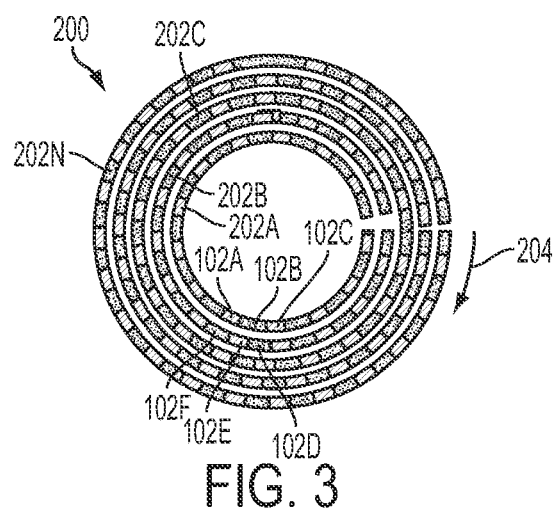
FIG. 3 is a schematic illustration of 'wrapped' annular rasters.
Figure 4:
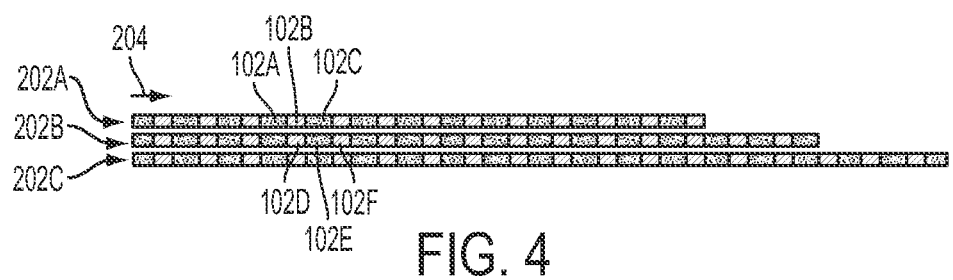
FIG. 4 is a schematic illustration of an 'unwrapping' of annuli displaying rectangles that represent pixels.

In some radially oriented labeling mechanisms, the source label image is halftoned in Cartesian coordinates and resampled to polar coordinates. This method can cause graininess in stochastic halftones and moiré pattern defects in periodic halftones. Other methods perform error diffusion along the annular rasters, with the added complexity of book-keeping tables of neighboring pixel locations on neighboring annular rasters. By way of further background, FIG. 3 shows a schematic, where the annular rasters are "wrapped" and spaced to identify neighboring pixels on neighboring rasters, which must be managed through book-keeping in a complicated error diffusion process. FIG. 4 shows an "uwrapping" of the annuli, and FIG. 5 shows near neighbors, which are used in a complicated error diffusion process.

FIG. 3 shows a representative flat curved surface 200. The curved surface 200 has a number of concentric circular tracks, from an innermost track 202A to an outermost track 202N. These are the circular tracks 202A, 202B, 202C, . . . , 202N, collectively referred to as the circular tracks 202. The pixels of the tracks 202 are substantially the same size. The pixels 102 are depicted in FIG. 3 as representative pixels along the tracks 202A and 202B. The pixels 102 are ordered in a clockwise manner, as indicated by the arrow 204.

FIG. 4 shows three tracks 202A, 202B, and 202C "unwound" or "unrolled" in rectilinear fashion. The arrow 204 is again depicted. Unrolling the tracks 202A, 202B, and 202C yields the pixels 102 as not correctly mapped. That is, the pixel 102E, which is defined as the pixel on the track 202B that is most immediately adjacent to the pixel 102B on the track 202A, is in fact not immediately adjacent to the pixel 102B in FIG. 4, but actually is adjacent to the pixel to the right of the pixel 102C on the track 202A.

Figure 5:
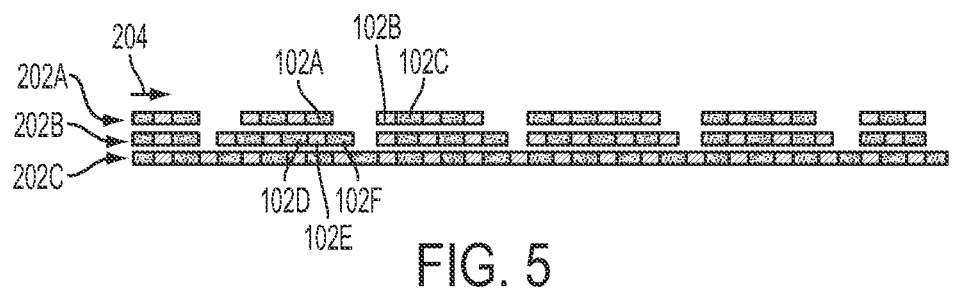
FIG. 5 is a schematic illustration of an 'unwrapping' of annuli, and near neighbors, displaying rectangles that represent pixels.

By comparison, FIG. 5 shows the three tracks 202A, 202B, and 202C again "unwound" or "unrolled" in rectilinear fashion, but where spacings among the pixels thereof have been introduced to preserve the relative positions of pixels among adjacent tracks. The arrow 204 is again depicted. In FIG. 5, it is shown that the pixel 102E is immediately adjacent to the pixel 102B on an inter-track basis. FIG. 5 also shows that the pixel 102D is to the left of the pixel 102E and the pixel 102F is to the right of the pixel 102E, as before. The spacing between the pixels 102D and 102E has been inserted in FIG. 5 to preserve the proper spatial relationship between the pixels 102E and 102B. The pixel 102A is to the left of the pixel 102B and the pixel 102C is to the right of the pixel 102B. The double spacing between the pixels 102A and 102B has been inserted in FIG. 5 to preserve the proper spatial relationship between the pixels 102E and 102B.

The mapping of each pixel of each curved track to a correspondingly adjacent pixel on the next curved track can be achieved so that a halftoning approach designed for rectangular images can instead be performed in relation to curved images. For each pixel 102B on a given track, in other words, the correspondingly adjacent pixel 102E on the next track is mapped. Once this mapping has been determined, the other relevant pixels to the pixel 102B—the pixels 102C, 102D, and 102F—are easily determined in relation to the pixel 102B or in relation to the pixel 102E.

As stated above, disc labeling systems are available that write using annular rasters with uniformly spaced raster lines and uniformly spaced pixels within the raster lines. One known method performs the writing by moving a writing head on a sled to annular raster positions, then writes with a timing synchronized to the linear velocity of the annulus. Writing heads have been described as ink jet, or an IR laser for use on thermally sensitive media. Another method utilizes an image bar that extends on a radial line of the disk. The actual writing elements can again be ink jet, or an IR source.

The present disclosure provides a method to be described hereinafter, for halftone tiling and halftoning on annular rasters, which are used in some disc (CD, DVD, Blu-ray) labeling devices. The disclosure provides the following framework in one exemplary process: assume annular rasters (as opposed to Cartesian or spiral); pixels are uniformly spaced around an annulus, and pixel-to-pixel spacing is similar for each raster; wedge-shaped halftone cells are tiled angularly around the disc print medium, where an integer number of wedge tiles fills the disc space for full disc writing; the thresholds in the wedge are considered in arcs so as to conform to annular rasters upon tiling the halftone cell; and, the number of pixel thresholds in each arc raster of the cell are set to an integer value near the desired writing resolution to enable seamless tiling. The number of thresholds can increase as a function of wedge radius and the thresholds are accessed in a modulo manner along arc rasters as the writing device creates an annulus of dots.

It is to be appreciated that pixels can be uniformly spaced around an annulus, and pixel-to-pixel spacing can be similar for each raster. A given annular raster can be written as a disk spins. The raster time (spin time) for any raster can be divided into an integer number of equally spaced pixels to avoid density variation. In particular, it is important to avoid a spacing error where the SOS and EOS meet (start of scan, end of scan). It is desirable to have similar pixel-to-pixel spacing on each raster to maintain image density as a function of radius. Uniform pixel spacing along the length of an annular raster can be achieved through constant linear velocity with constant pixel timing. A neighboring raster can be written with a different linear velocity or different pixel timing or both to achieve a similar raster spacing along its raster length.

Several parameters that will enable an understanding of the pixel and raster relationships are defined hereinafter:

$i_r$=radial index, e.g, radius 1, 2, ...;
$r_i$=radius of the $i_r$th annular raster;
$C(i_r)$=length of the $i_r$th raster=$2\pi r_i$ for full disc writing (shorter raster lengths can be employed if <360° writing is used);
S=nominal number of pixels per inch, e.g., 600 spi (addressability can be different for number of annular rasters/inch and number of pixels/inch within a rasters);
$S(i_r)$=number of pixels per inch for the $i_r$ raster (without the tiling constraint given below, a good choice for $S(i_r)$ would be $S(i_r)$=Round[S $C(i_r)$]/$C(i_r)$);
$N(i_r)$=number of pixels for the $i_r$ raster, it is an integer=$S(i_r) C(i_r)$;
T=number of tiles used to fill an area with thresholds; and,
$N_T(I_r)$=number of pixels for the $i_r$ raster within a tile.

Figure 6:
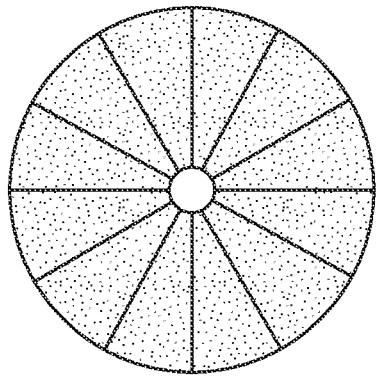
FIG. 6 is an illustration of wedge halftone cells tiling a disc for full disc writing.
Figure 7:
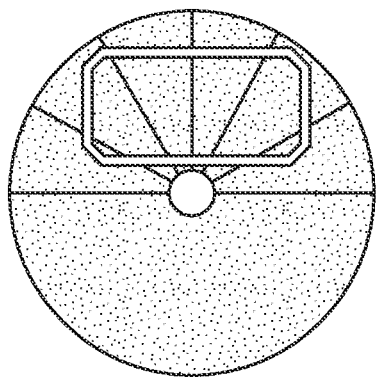
FIG. 7 is an illustration of wedge halftone cells tiling a disc for partial disc writing.

Wedge-shaped halftone cells can be tiled angularly around the disc print medium, where an integer number of wedge tiles fills the disc space. To form proper tiles, the angle subtended by a wedge halftone cell width can be an integer divisor of 360° if the image is to be written around the full circle of the disk. For example, a 5° wedge cell would be replicated 72 times to tile the circular plane. The integer divisor constraint is not needed if <360° writing is used. FIG. 6 illustrates the tiling for full disc writing and FIG. 7 illustrates the tiling for partial disc writing.

The thresholds in the wedge can be considered in arcs so as to conform to annular rasters upon tiling the halftone cell. In designing the halftone cell, one can consider the raster to be an arc rather than the conventional straight line. One impact of this geometry is on the setting of thresholds within a cell. For instance, in designing a stochastic screen, there is usually an optimality criterion that attempts to place minority pixels (spots) as far as possible from other minority pixels for a given gray level. A higher quality result (less texture) will be achieved if the spot-to-spot distances are calculated assuming they are placed on arcs rather than Cartesian rasters. Clustered dot designs could also benefit by accounting for the distances and positions of pixels on arc rasters when positioning and shaping halftone dots.

The number of pixel thresholds in each arc raster of the cell can be set to an integer value near the desired writing resolution to enable seamless tiling. The number of thresholds increases as a function of wedge radius. Each arc raster of a cell can possess an integer number of pixel thresholds so that the tiles replicate seamlessly around the disc. This tiling requirement affects the number of pixel thresholds per arc length and the total number of pixel thresholds in each arc. Without a tiling constraint, one exemplary choice for the number of thresholds per arc length $S(i_r)$ would be $S(i_r)$=Round[S $C(i_r)$]/$C(i_r)$. The tiling constraint leads to:

$S(i_r)$=Round[S $C(i_r)$/T]/($C(i_r)$/T). The number of pixel thresholds in each arc raster of the cell can be expressed as $N(i_r)$=$S(i_r) C(i_r)$, while the number of pixel thresholds in each arc raster of the cell is $N_T(i_r)$=$S(i_r) C(i_r)$/T.

Thresholds can be accessed in a modulo manner along arc rasters as the writing device creates an annulus of dots, and can define input gray-scale image values defined on arc coordinates $f(i_{ir}, i_r)$, where is a counter along the length of arc $i_r$. The thresholds in the cells $t_N(k, i_r)$ can be applied to the image pixels values to obtain binary values to drive the imager according to:

$$b(i_{ir}, i_r) = \begin{cases} 0, & f(i_{ir}, i_r) < t_N(k, i_r) \\ 1, & f(i_{ir}, i_r) \geq t_N(k, i_r) \end{cases}$$

where k=$i_{ir}$ modulo $N(i_r)$. Conventional halftoning requires shifts between rows of tiles to access the proper thresholds. The present disclosure does not utilize a cell shift between rows of tiles because cells are not tiled in successive rows.

The wedge tiling method of the present disclosure is well suited for all varieties of stochastic screening, including vector stochastic screening, and may also be used with clustered dot halftones. One exemplary method is detailed below:

EXAMPLE

An example monochrome stochastic screen can be designed with the following specifications:
S=600 annular rasters/inch;
<64K thresholds (approximate number of thresholds in a 256×256 stochastic screen);
$r_0$=inner wedge radius ⅝";
$r_{975}$=outer wedge radius 2¼";
angular width of tile=5°;
T=number of tiles to fill a CD labeling area 72; and,
number of arc rasters per cell=976.

Figure 8:
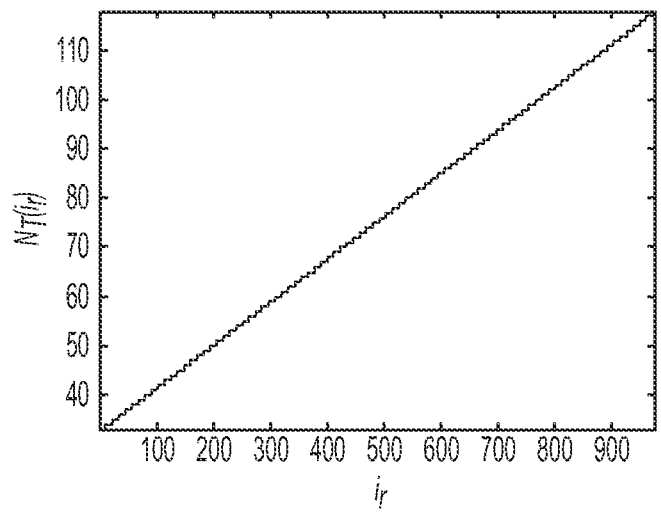
FIG. 8 is a graph of the number of pixels per raster as a function of a radial index.
Figure 9:
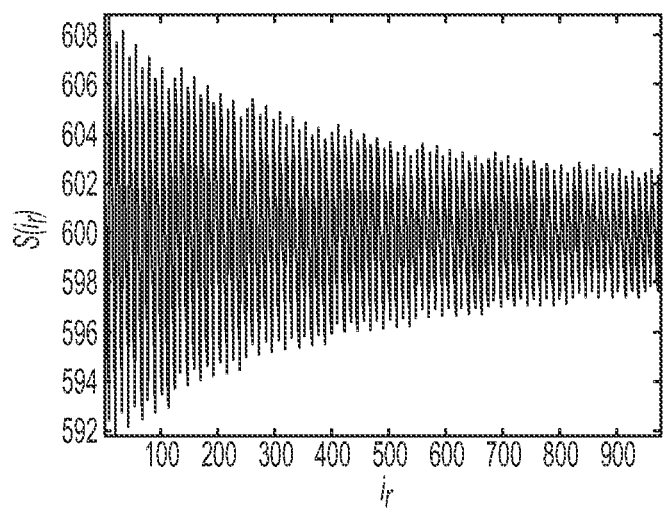
FIG. 9 is a graph of the pixels per inch as a function of the radial index for a 5 degree tile with 600 annular rasters/inch.

FIG. 8 shows the number of pixels per raster $N_T(i_r)$ as a function of the radial index for a 5° tile. The radial index increases as the radius increases. FIG. 9 shows the resulting number of pixels per inch $S(i_r)$ as a function of the radial index $i_r$. Note that the maximum deviation from nominal resolution $(S-S(i_r))/S$ is only roughly 1% and occurs for only the smaller radii.

Figure 10:
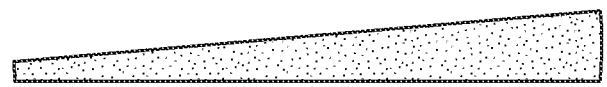
FIG. 10 displays an example halftone image resulting from the halftoning of a 50% area coverage contone image, for example, a single 5 degree tile; and, FIG. 11 displays an example halftone image resulting from the halftoning of a 50% area coverage contone image, for example, nine 5 degree tiles.
Figure 11:
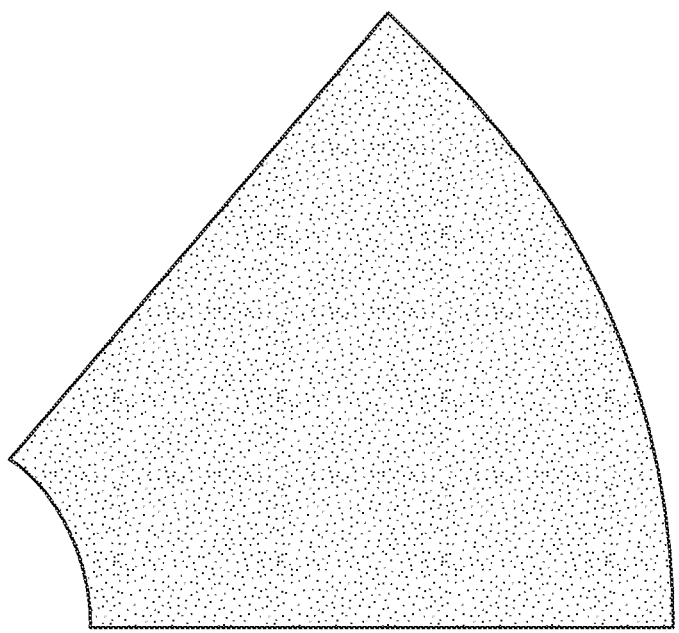

FIGS. 10-11 show two exemplary halftone images resulting from the halftoning of a 50% area coverage contone image. FIG. 10 shows a single 5° tile while FIG. 11 shows the image resulting from the tiling of nine 5° tiles.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A halftoning method for annular rasters comprising:
    using annular rasters with uniformly spaced raster lines and uniformly spaced pixels within said raster lines;
    angularly tiling wedge shaped halftone cells around at least a partial circumferential print medium wherein an integer number of wedge tiles fills a disc space;
    wherein said annular rasters are considered in arcs and wherein pixel thresholds in said wedge shaped halftone cells are considered in arcs so as to conform to said annular rasters upon tiling said wedge shaped halftone cells;
    setting the number of pixel thresholds in each arc raster of said cell to an integer value near a desired writing resolution to enable seamless tiling wherein said number of thresholds increase as a function of a wedge cell radius; and printing, using a printer, said annular rasters on an at least partial circumferential printing medium.

2. The halftoning method according to claim 1, further comprising:

substantially uniformly spacing said pixels around an annulus wherein pixel-to-pixel spacing is similar for each said raster.

3. The halftoning method according to claim 2, further comprising:

accessing thresholds in a modulo manner along said arc rasters as a writing device creates an annulus of dots.

4. The halftoning method according to claim 1, further comprising:

accessing thresholds in a modulo manner along said arc rasters as a writing device creates an annulus of dots.

5. A halftoning method for annular rasters comprising:

using annular rasters with uniformly spaced raster lines and uniformly spaced pixels within said raster lines;

angularly tiling wedge shaped halftone cells around at least a partial circumferential print medium wherein an integer number of wedge tiles fills a disc space and an angle subtended by a wedge halftone cell width is an integer divisor of 360 degrees if the image is to be written around a full circle;

wherein said annular rasters are considered in arcs and wherein pixel thresholds in said wedge shaped halftone cells are considered in arcs so as to conform to said annular rasters upon tiling said wedge shaped halftone cells;

setting the number of pixel thresholds in each arc raster of said cell to an integer value near a desired writing resolution to enable seamless tiling wherein said number of thresholds increase as a function of a wedge cell radius; and printing, using a printer, said annular rasters on an at least partial circumferential printing medium.

6. The halftoning method according to claim 5, further comprising:

substantially uniformly spacing pixels around an annulus wherein pixel-to-pixel spacing is similar for each said raster; and, wherein said uniform pixel spacing is achieved through a constant linear velocity and a constant pixel timing of a spinning disk while writing.

7. The halftoning method according to claim 6, wherein the number of pixels for each annular raster is an integer and includes a product of a number of pixels per inch for the annular raster and (2pi) times said wedge cell radius.

8. The halftoning method according to claim 7, further comprising:

accessing thresholds in a modulo manner along arc rasters as a writing device creates an annulus of dots.

9. The halftoning method according to claim 6, further comprising:

accessing thresholds in a modulo manner along arc rasters as a writing device creates an annulus of dots.

10. The halftoning method according to claim 5, further comprising:

substantially uniformly spacing pixels around an annulus wherein pixel-to-pixel spacing is similar for each said raster; and, wherein said uniform pixel spacing is achieved through a controlled linear velocity and a controlled pixel timing of a spinning disk while writing.

11. A halftoning method for annular rasters comprising:

using annular rasters with uniformly spaced raster lines and uniformly spaced pixels within said raster lines;

substantially uniformly spacing pixels around an annulus wherein pixel-to-pixel spacing is similar for each said raster and wherein the number of pixels for each annular raster is an integer and includes a product of a number of pixels per inch for the annular raster and (2pi) times a radius of said annular raster;

angularly tiling wedge shaped halftone cells around at least a partial circumferential print medium wherein an integer number of wedge tiles fills a disc space;

wherein said annular rasters are considered in arcs and wherein pixel thresholds in said wedge shaped halftone cells are considered in arcs so as to conform to said annular rasters upon tiling said wedge shaped halftone cells;

setting the number of pixel thresholds in each arc raster of said cell to an integer value near a desired writing resolution to enable seamless tiling wherein said number of thresholds increase as a function of a wedge cell radius; and printing, using a printer, said annular rasters on an at least partial circumferential printing medium.

12. The halftoning method according to claim 11, wherein said uniform pixel spacing is achieved through a constant linear velocity and a constant pixel timing of a spinning disk while writing.

13. The halftoning method according to claim 11, wherein said uniform pixel spacing is achieved through a controlled linear velocity and a controlled pixel timing of a spinning disk while writing.

14. The halftoning method according to claim 11, further comprising:

accessing thresholds in a modulo manner along arc rasters as a writing device creates an annulus of dots.

15. The halftoning method according to claim 11, further comprising:

an angle subtended by a wedge halftone cell width is an integer divisor of 360 degrees if the image is to be written around a full circle.

16. A system of halftoning for annular rasters comprising:

using annular rasters with uniformly spaced raster lines and uniformly spaced pixels within said raster lines;

angularly tiling wedge shaped halftone cells around at least a partial circumferential print medium wherein an integer number of wedge tiles fills a disc space;

wherein said annular rasters are considered in arcs and wherein pixel thresholds in said wedge shaped halftone cells are considered in arcs so as to conform to said annular rasters upon tiling said wedge shaped halftone cells;

substantially uniformly spacing pixels around an annulus wherein pixel-to-pixel spacing is similar for each said raster;

wherein said uniform pixel spacing is achieved through a controlled linear velocity and a controlled pixel timing of a spinning disk while writing;

setting the number of pixel thresholds in each arc raster of said cell to an integer value near a desired writing resolution to enable seamless tiling wherein said number of thresholds increase as a function of a wedge cell radius; and printing, using a printer, said annular rasters on an at least partial circumferential printing medium.

17. A system of halftoning for annular rasters comprising:
using annular rasters with uniformly spaced raster lines and uniformly spaced pixels within said raster lines;
angularly tiling wedge shaped halftone cells around at least a partial circumferential print medium wherein an integer number of wedge tiles fills a disc space;
wherein said annular rasters are considered in arcs and wherein pixel thresholds in said wedge shaped halftone cells are considered in arcs so as to conform to said annular rasters upon tiling said wedge shaped halftone cells;
substantially uniformly spacing pixels around an annulus wherein pixel-to-pixel spacing is similar for each said raster;
wherein said uniform pixel spacing is achieved through a controlled linear velocity and a controlled pixel timing of a spinning disk while writing;
accessing thresholds in a modulo manner along arc rasters as a writing device creates an annulus of dots; and
printing, using a printer, said annular rasters on an at least partial circumferential printing medium.

* * * * *